United States Patent [19]
Karlsson et al.

[11] Patent Number: 6,041,593
[45] Date of Patent: Mar. 28, 2000

[54] EXHAUST OXIDATION

[76] Inventors: Sören Karlsson, Skepparegatan 11, S-462 35 Vänersborg; Roger Tengblad, Fyrverkaregatan 11, S-413 21 Göteborg; Göran Wirmark, Kung Sverres gata 48, S-417 28 Göteborg; Jan-Erik Larsson, Londongatan 63, S-418 77 Göteborg; Magnus Blomroos, Guldringen 18, S-426 52 Västra Frölunda, all of Sweden

[21] Appl. No.: 08/606,034

[22] Filed: Feb. 22, 1996

[51] Int. Cl.[7] ........................................... F01N 3/00
[52] U.S. Cl. .............................. 60/284; 60/289; 60/305; 60/274
[58] Field of Search .................... 60/274, 284, 289, 60/297, 305

[56]  References Cited

U.S. PATENT DOCUMENTS

| 3,986,352 | 10/1976 | Casey ......................................... 60/284 |
| 4,099,377 | 7/1978 | Yoshimura ................................. 60/293 |
| 4,106,287 | 8/1978 | Auclair et al. . | |
| 4,209,981 | 7/1980 | Miyamori ................................... 60/274 |
| 5,577,383 | 11/1996 | Kuroda et al. ............................. 60/285 |

FOREIGN PATENT DOCUMENTS

WO 92/22734  12/1992  WIPO .
WO 93/07365   4/1993  WIPO .

OTHER PUBLICATIONS

Die Motoren im neuen Opel Omega, Heinz–Ewo Brand et al., Motortechnische Zeitschrift, vol. 55 (1994), No. 4, pp. 198–206.
SAE Report No. 730201, Warmup Limitations on Thermal Reactor Oxidation, Donald D. Patterson et al.
SAE Report No. 710608, A Well–Mixed Thermal Reactor System for Automotive Emission Control, Robert J. Lang.
SAE Report No. 730202, Limiting Factors on Steady–State Thermal Reactor Performance, Robert H. Kadlec et al.
SAE Report No. 920400, Exhaust gas ignition (EGI)—A New Concept for Rapid Light–Off of Automotive Exhaust Catalyst, T. Ma et al.

Primary Examiner—Thomas E. Denion
Attorney, Agent, or Firm—Birch, Stewart, Kolasch & Birch, LLP

[57]  ABSTRACT

The invention relates to a device and a method for reducing emissions in catalytic converter exhaust systems for a vehicle provided with a combustion engine. The invention comprises a control unit adapted to control the air-fuel being fed to the engine so that a high concentration of hydrogen is generated in the exhaust gas during start-up of the engine. Furthermore, secondary air is supplied downstream of the engine during cold starting thereof for forming a gas mixture with the exhaust gas. This gas mixture is oxidized, so that heat energy generated by means of this oxidation is supplied to the catalyst, thereby providing a reduction of the light-off time of the catalyst.

13 Claims, 3 Drawing Sheets

EXHAUST OXIDATION

TECHNICAL FIELD

The present invention relates to a device and a method for reducing emissions in catalytic converter exhaust systems far a vehicle provided with a combustion engine. In particular, the invention relates to a device and a method by means of which the so-called "light-off" time of the catalytic converter can be reduced, while at the same time the raw emissions discharged from the engine to the catalytic converter are reduced.

BACKGROUND OF THE INVENTION

In the field of motor vehicles which are operated by means of combustion engines it is a general requirement that the concentration of harmful substances in the engine's exhaust gas should be as low as possible. These harmful substances are mainly present in the form of unburnt residues of hydrocarbons (HC), oxides of nitrogen ($NO_x$) and carbon monoxide (CO). In today's motor vehicles equipped with gasoline engines, a purification of the exhaust gas is normally carried out by means of a catalytic converter, or catalyst, arranged in the exhaust system. In the modern so-called three-way catalyst, the major part of the above-mentioned harmful substances is eliminated by means of various well-known catalytic reactions.

Today's catalysts provide a very high degree of purification, i.e. a conversion of harmful exhaust gas components to carbon monoxide and water. This means that they eliminate a very high quantity of the harmful emissions in the exhaust gas at the appropriate operating temperature of the catalyst. However, they suffer from the problem that they must be heated for a certain time period in order to reach the operating temperature at which an optimum degree of purification can be obtained. The so-called "light-off temperature" of the catalyst is approximately 200–350° C. and can be defined as the temperature at which the catalyst provides a 50% degree of purification of a certain harmful component in the exhaust gases. During the initial warm-up phase of the catalyst, which is approximately 30–90 seconds, the catalyst cannot operate in an optimum manner as regards the elimination of the harmful substances in the exhaust gases. Obviously, this constitutes a problem which arises during cold starting of a vehicle.

A possible way to reduce the quantity of harmful emissions during said initial warm-up phase is to carry out various measures in order to shorten the time taken for the catalyst to reach its light-off temperature. During a cold start, this can be achieved by generating increased heat energy into the exhaust system which subsequently causes the catalyst to be rapidly heated.

A previously known arrangement for obtaining this reduction in time for the light-off temperature to be reached is one comprising an electrically heated catalyst which is arranged upstream of the main catalyst. However, this arrangement implies certain drawbacks. Firstly, the cost for a heatable catalyst is considerable. Furthermore, the consumption of electrical energy is relatively high. An additional power supply such as an extra battery may be required in the vehicle. Also, the durability of the electrically heatable catalyst may constitute a problem.

Another arrangement, which is disclosed in the journal Motortechnische Zeitschrift, Vol. 55 (1994), No. 4, pages 198–206, "Die Motoren im neuen Opel Omega", Heinz-Ewo Brand at al, comprises means for injecting secondary air into the exhaust gas. This secondary air is mixed with the exhaust gas in the exhaust port and in a plenum volume immediately downstream of the engine's exhaust valves, resulting in an oxidation of the mixture consisting of the exhaust gases and the secondary air. This oxidation results in a generation of heat energy which is fed to the catalyst, which consequently will become heated.

This arrangement is based on the fact that, during cold starting, the engine is operated so as to provide a certain stoichiometric excess of fuel in the air/fuel mixture which is fed to the engine. The enriching of the air/fuel ratio to a level which gives a lambda value below $\lambda=1$ will cause excess hydrogen ($H_2$), carbon monoxide, (CO) and hydrocarbons (HC) to be generated in the exhaust gases. By reducing $\lambda$ to a value of approximately 0.7 for example, the corresponding amount of hydrogen in the exhaust gases will then be present in an amount of about 5% by volume of the exhaust gas.

Such low values of the A parameter can be achieved by altering the engine's control system in such a way that the control output to the fuel injector is arranged to ensure a rich air/fuel mixture during the start-up phase. Such may occur by increasing the fuel injection time and/or decreasing the amount of input air to the engine. Further methods are also available for increasing the amount of hydrogen gas and other combustible components in the exhaust gas, such as changing fuel injection or ignition timing, adjusting the timing of the engine valve lifting or even by appying stratified combustion in the combustion chamber.

As previously mentioned, the secondary air is mixed with the exhaust gases, resulting in an oxidation process which is mainly due to the hydrogen which is present in the exhaust gases. The oxidation reaction generates a high amount of heat energy which is guided through the exhaust pipe and to the catalyst, which subsequently becomes rapidly heated.

Although the above-mentioned arrangement results in a reduced time taken until the light-off temperature of the catalyst is reached, it suffers from the drawback that the performance of the engine Is negatively affected. This is due to the fact that the known arrangement cannot be effectively tuned for optimum engine power and engine torque. As regards the tuning of an engine, the design of the engine outlets should always be considered, so as to provide an optimum volumetric efficiency of the engine. The geometry of the exhaust manifold according to the arrangement described in the above-mentioned article "Die Motoren im neuem Opel Omega" does not allow any such tuning, which is essential if the engine's performance is to be optimized.

Another drawback of the arrangement according to said article is that during cold starting, little or no consideration is taken to the temperature of the catalyst. This means that the engine is controlled so as to generate hydrogen when this is not needed, for example when the catalyst has already reached its light-off temperature. In other words, excess fuel can be supplied to the engine, which results in increased fuel consumption.

For turbocharged engines the time period to reach optimum performance of the catalyst is usually longer than for naturally aspirated engines. This is mainly due to the fact that the turbocharger acts as a heat sink and reduces the temperature of the exhaust gas before entering the catalyst. The above-mentioned arrangements for exhaust oxidation have as yet not been applied to turbocharged engines.

Another system for reducing the emissions is known from the documents WO-A-92/22734 and WO-A-93/07365, which disclose a system in which the hydrogen and oxygen mixture is guided to a separate afterburner combustion chamber, which is arranged downstream of the exhaust pipe.

When the exhaust gas reaches the afterburner combustion chamber it is ignited by means of a special ignition device immediately after the engine has first fired. This is achieved by ensuring that the concentration of hydrogen and oxygen remains within known flammability limits. In order to obtain the required concentrations, the fuel/air mixture is enriched significantly so as to obtain additional hydrogen, whilst additional oxygen is added by means of a supplementary air pump.

Although an improvement is obtained hereby, a severe drawback of the system is that an ignition device is required in the afterburner in order to ignite the gas mixture. Such an ignition device constitutes an extra component which is prone to failure. Moreover, from the consumer point of view, this is undesirable due to the resultant extra cost involved with the more expensive exhaust system and the ensuing costs of servicing and/or replacing worn-out or faulty afterburner ignition devices.

SUMMARY OF THE INVENTION

A main object of the invention is thus to overcome the above-mentioned disadvantages and to provide an improved device for reducing emissions in catalytic converter exhaust systems, which device does not involve any significant deterioration in the performance of the engine and which provides a significant reduction of the time taken for the light-off temperature of the catalyst to be reached.

The above-mentioned object is accomplished by a device for reducing emissions in a catalytic converter exhaust system for a combustion engine, said catalytic converter providing reduced emissions after a light-off time has passed during start-up of the engine. Said device comprises an exhaust pipe connecting the engine with the catalytic converter, air/fuel mixture forming means for providing a mixture of air and fuel to the engine, a control unit adapted for controlling the air-fuel mixture forming means so that a high concentration of hydrogen and other combustible gases such as carbon monoxide and hydrocarbons are generated in the exhaust gas during start-up of the engine, and air supply means for supplying secondary air downstream of at least one engine exhaust valve during cold starting of the engine, for forming a gas mixture with the exhaust gas. The engine is provided with a plurality of primary exhaust outlet pipes designed for optimizing an external gas exchange system of the engine. Furthermore, said control unit is adapted to control said generation of hydrogen and the operation of said air supply means, thereby generating an exhaust oxidation in said gas mixture, so that heat energy generated during the oxidation is supplied to the catalyst, thereby providing a reduction of the light-oft time of the catalyst.

The invention is particularly useful in engines provided with so-called primary exhaust outlet pipes. These pipes correspond in number to the number of cylinders in the engine. The primary exhaust outlet pipes (in the following simply referred to as "primary pipes") are designed as pipe elements which are arranged at the respective cylinder outlets of the engine. The primary pipes from the cylinders coincide to form a plenum chamber, to which the exhaust gas from all the cylinders is fed. The exhaust gas is fed through the primary pipes, via the plenum chamber, and a conventional exhaust pipe which leads to the catalyst The geometry of each primary pipe is chosen in dependence of the flow requirements set by the combustion chamber and the inlet manifold and air-fuel inlet pipes. In this manner, the engine can be optimised so as to provide proved performance and a high volumetric efficiency. Another important factor which is affected by the geometry of the exhaust pipes and manifold is the amount of residuals in the combustion chamber. An optimised design can reduce fuel consumption without leading to problems with unstable combustion.

Preferably, the primary exhaust outlet pipes are shaped with a first section and a second section, the second section having a larger cross-sectional area than the first section.

A further object of the invention is to provide an improved device for reducing emissions in catalytic converter exhaust systems for turbo-charged engines. This object is accomplished by means of a device for reducing emissions in a catalytic converter exhaust system for a combustion engine provided with a turbo-charger device, comprising an exhaust pipe connecting the engine with the catalytic converter, air/fuel mixture forming means for providing a mixture of air and fuel to the engine, a control unit adapted to control the air-fuel mixture forming means so that a high concentration of hydrogen and other combustible gases such as carbon monoxide and hydrocarbons are generated in the exhaust gas during start-up of the engine, and air supply means for supplying secondary air downstream of at least one engine exhaust valve during cold starting of the engine, for forming a gas mixture with the exhaust gas Said control unit is adapted for generating an exhaust oxidation in said gas mixture and said engine is provided with an exhaust manifold, the volume of which is adapted to provide an exhaust oxidation of substantially all combustible components in said gas mixture before said gas mixture is fed to the turbo-charger device.

This object is also accomplished by means of a device for reducing emissions in a catalytic converter exhaust system for a combustion engine provided with a turbo-charger device, comprising an exhaust pipe connecting the engine with the catalytic converter, air/fuel mixture forming means for providing a mixture of air and fuel to the engine, a control unit adapted to control the air/fuel mixture forming means so that a high concentration of hydrogen and other combustible gases such as carbon monoxide and hydrocarbons are generated in the exhaust gas during start-up of the engine, and air supply means for supplying secondary air downstream of at least one engine exhaust valve during cold starting of the engine, for forming a gas mixture with the exhaust gas. The control unit is adapted for generating an exhaust oxidation in said gas mixture, wherein the exhaust pipe is split to form a bypass pipe for guiding exhaust gas around the turbine and a valve is arranged in said bypass pipe, which valve is connected to the control unit and can be controlled to an open condition during said exhaust oxidation.

A further object of the invention is to provide an improved method for reducing emissions in catalytic converter exhaust systems. This is accomplished by means of a method for reducing emissions in a catalytic converter exhaust system for a combustion engine, said catalytic converter providing reduced emissions after a light-off time has passed during start-up of the engine, wherein the catalytic converter and the engine are connected by means of an exhaust pipe and the engine being provided with at least two primary exhaust outlet pipes coinciding in a plenum volume forming part of an exhaust manifold. The method comprises the following steps: providing a mixture of air and fuel to the engine via air/fuel mixture forming means, controlling said air/fuel mixture forming means so that a high concentration of hydrogen and other combustible gases such as carbon monoxide and hydrocarbons are generated in the exhaust gas during the start-up of the engine, supplying secondary air downstream of at least one engine exhaust valve during cold starting of the engine for forming a gas mixture with said exhaust gas, and generating an oxidation of said gas mixture in the primary exhaust outlet pipes, the exhaust manifold and the exhaust pipe, so that heat energy generated by means of said oxidation is supplied to the catalyst, thereby providing a reduction of the light-off time of the catalyst.

A further object of the invention is to provide an improved method for reducing emissions in catalytic converter exhaust systems for use in turbo-charged engines. This object is accomplished by means of a method for reducing emissions in a catalytic converter exhaust system for a combustion engine, the catalytic converter and the engine being connected by means of an exhaust pipe and the engine being provided with a turbo-charger device and a plurality of exhaust outlets coinciding in a plenum volume -forming part of an exhaust manifold, said method comprising the following steps: providing a mixture of air and fuel to the engine via air/fuel mixture forming means, controlling said air/fuel mixture forming means so that a high concentration of hydrogen and other combustible gases such as carbon monoxide and hydrocarbons are generated in the exhaust gas during the start-up of the engine, supplying secondary air downstream of at least one engine exhaust valve during cold starting, for forming a gas mixture with said exhaust gas, and generating an oxidation of said gas mixture in said plenum volume in a manner so that an exhaust oxidation of substantially all combustible components in said gas mixture occurs before said gas mixture is fed to the turbo device, wherein the heat energy which is generated by means of said oxidation is supplied to the catalyst.

BRIEF DESCRIPTION OF THE DRAWINGS

The invention will now be described in greater detail by way of example only and with reference to particular embodiments illustrated in the annexed drawings, in which.

DETAILED DESCRIPTION OF THE PREFERRED EMBODIMENTS

Figure 1:
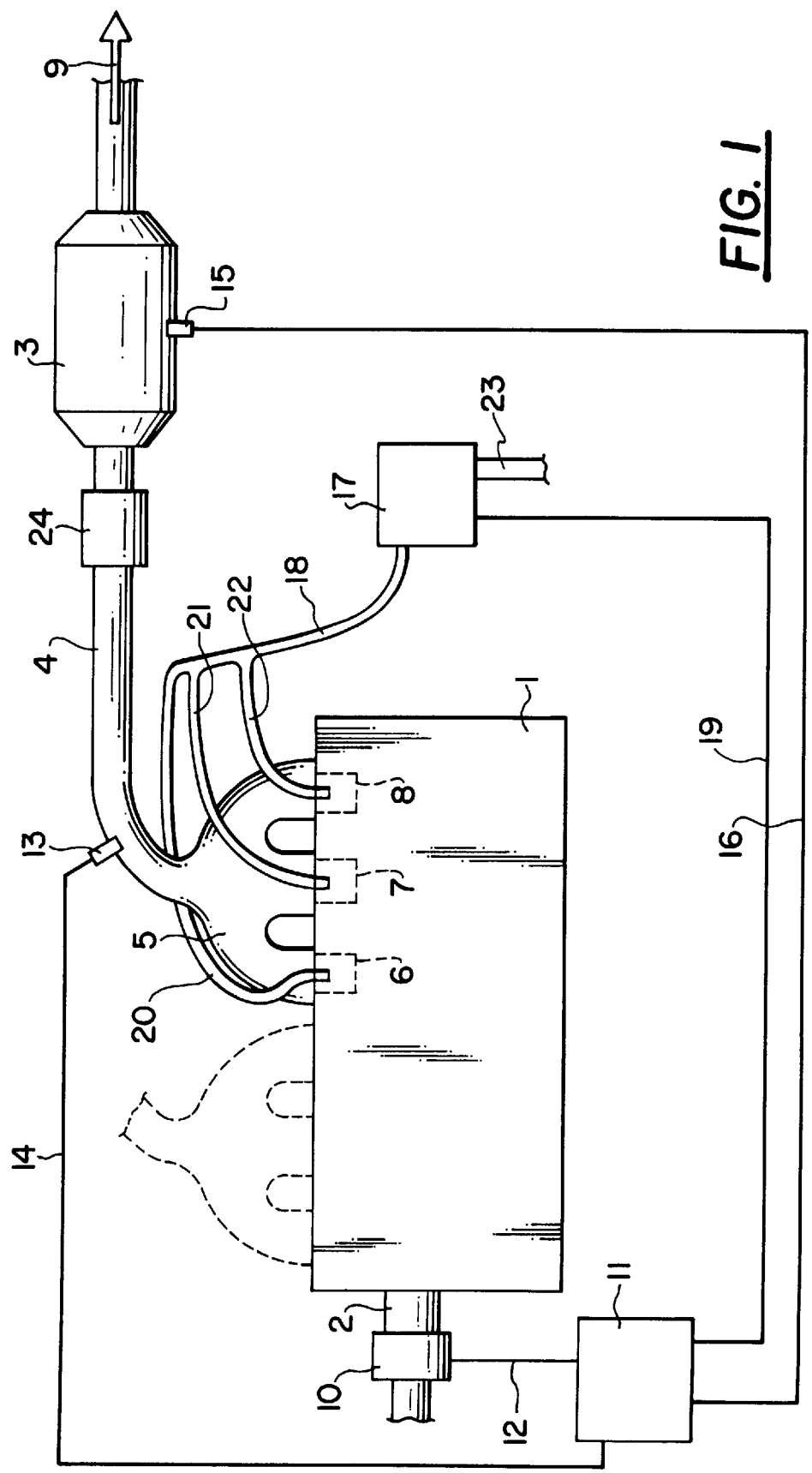
FIG. 1 shows schematically a diagram of a vehicle engine and an exhaust system comprising the present invention.

FIG. 1 shows in a simplified manner a system in which the device according to the present invention in incorporated. The system is arranged in connection with a combustion engine 1 which is a conventional engine of the naturally aspirated type. In a known manner, the engine 1 is supplied with an air/fuel mixture via an intake manifold 2. Furthermore, the engine 1 is connected to a catalytic converter 3 which preferably is in the form of a conventional three-way catalyst which is adapted to reduce the harmful substances carbon monoxide (CO), hydrocarbon (HC) and oxides of nitrogen ($NO_x$) which are present in the exhaust gas. The exhaust gas is discharged from the engine 1 via an exhaust pipe 4.

Downstream of the engine 1, the exhaust pipe 4 is connected to an exhaust manifold 5 through which the exhaust gas is fed. FIG. 1 depicts three cylinder outlets in the form of primary exhaust outlet pipes (or "primary pipes") 6, 7, 8, which indicates that the engine 1 is of the type which comprises six cylinders arranged in two banks with three cylinders each. It should be noted that FIG. 1 shows a simplified view of the engine 1, and that certain parts such as cylinder pistons and engine valves are not shown. It should also be noted that the invention can be applied in engines having other cylinder configurations. The exhaust manifold 5 is designed in a manner so that the primary pipes 6, 7, 8 extend from the engine's respective cylinder to a common volume, the so-called plenum volume, which is located upstream of the exhaust pipe 4. The main purpose of the primary pipes 6, 7, 8 is to optimize the external gas exchange system of the engine 1.

Once the exhaust gases have passed through the catalyst 3, they are discharged to the atmosphere through the silencer system (not shown). this is indicated by an arrow 9.

In order to obtain a suitable air/fuel mixture, the engine 1 is provided with air/fuel mixture forming means 10 which is arranged in the intake manifold 2. The operation of the air/fuel mixture forming means 10 is controlled by a electronic control unit 11 via an electrical connection 12. The mixture forming means 10 comprises at least one fuel injector (not shown) and an air inlet valve (not shown). The control unit 11 is arranged to adapt the air/fuel mixture to the engine 1 in accordance with the engine's operating conditions.

The control unit 11 is also connected to various sensors and control functions of the engine 1. The control unit 11 is known per se, but has been provided with certain additional control functions, as will become apparent below. An exhaust gas sensor, preferably in the form of an oxygen sensor 13, is arranged in the exhaust pipe 4 and provides a signal to the control unit 11, via an electrical connection 14, indicating the oxygen concentration in the exhaust gas. Furthermore, a temperature sensor 15 is arranged in connection with the catalyst 3 for providing an indication of the temperature of the catalyst 3 to the control unit 11 via a further electrical connection 16. It should be noted that information in the control unit 11 regarding the temperature of the catalyst 3 can also be provided by means of a software model which provides a measure of the temperature as a function of one or more of various operational parameters of the engine, for example the temperature of the cooling water and the ambient temperature. By means of such parameters, a value corresponding to an "expected" catalyst temperature can be calculated in the control unit 11. This value can be used for controlling the system in accordance with principles to be explained below. It should be noted that if the temperature of the catalyst 3 is to be calculated by means of a software model, no separate temperature sensor 15 is required.

By means of additional (not shown) sensors, e.g. a sensor for the cooling water, sensors for the temperature of the engine and the ambient atmosphere, an engine speed sensor, an engine crankshaft position sensor, an air mass flow meter and a throttle angle indicator, the control unit 11 is supplied with information regarding the engine operation. In a manner which is known, the control unit 11 controls the air/fuel mixture according to any given operating conditions of the engine.

According to the invention, the control unit 11 is adapted to control the operation of the engine 1 during cold starting in a manner so as to obtain a relatively high concentration of hydrogen in the exhaust gas. In this regard, the air/fuel mixture to the engine 1 in controlled so as to provide a stoichiometric air/fuel ratio corresponding to approximately $\lambda=0.6–0.8$, ices the air/fuel mixture to the engine is given an excess of fuel which, according to the known principles which have been described above, generates a certain amount of hydrogen and carbon monoxide in the exhaust gas.

In addition to the excess of fuel which is present in the air/fuel mixture to be delivered to the engine, the engine speed and the ignition timing are factors which also determine the amount of hydrogen generated. However, the hydrogen concentration in the exhaust gas is essentially determined by the stoichiometric fuel excess. The enriched air/fuel mixture which is present during this cold start operation provides a hydrogen concentration which preferably amounts to approximately 4–6% of the total gas volume in the exhaust gas.

Furthermore, and according to the invention, additional (or secondary) air should be added to the exhaust gas, thereby producing a gas mixture comprising exhaust gas and secondary air. According to a first embodiment of the invention, this secondary air is supplied by means of an air supply system in the form of an air pump 17, the output of which is connected via an air duct 18 to the exhaust manifold 5. The air pump 17, which is connected to the control unit 11 via an electrical connection 19, is preferably operated so as to provide secondary air during the time period during which an excess of hydrogen and carbon monoxide in the exhaust gas is generated, i.e. the time period up to a desired level of purification of harmful components in the exhaust gas by the catalyst 3 during cold starting. The desired level may or may not correspond to the 50% level described above.

The air duct 18 is designed with a number of branches 20, 21, 22, the outlets of which terminate in a corresponding primary pipe 6, 7 and 8, respectively. It should be noted that the number of branches of the air duct 18 preferably corresponds to the number of primary pipes of the engine 1.

The air pump 17 is adapted to be controlled by the control unit 11 to provide a flow of secondary air from the atmosphere, which flow is forced in through an inlet duct 23 forming part of the air pump 17. Furthermore, the air pump 17 is designed in a manner so as to provide an air flow of sufficient pressure to assure the desired air/fuel ratio in the exhaust gas mixture.

Furthermore, and according to known principles, the concentration of hydrogen in the exhaust gases in combination with the addition of secondary air to the exhaust gas provides an increased oxidation of combustible components in the exhaust gas. More specifically, the hydrogen, carbon monoxide and hydrocarbons in the exhaust gas will react with the oxygen being supplied by the secondary air if a certain threshold temperature $T_t$ in the gas mixture is reached. This time averaged threshold temperature $T_t$ is approximately 300–450° C.

The exhaust gas system according to the invention can also be provided with a so-called hydrocarbon adsorber 24, which is arranged upstream of the catalyst 3 or, alternatively, integrated within the catalyst 3. During operation of the engine 1, the hydrocarbon adsorber 24 adsorbs hydrocarbon compounds present in the exhaust. When the temperature of the exhaust gas, and thus also of the hydrocarbon adsorber 24, exceeds a certain threshold value, the hydrocarbon adsorber 24 will desorb the hydrocarbons which so far have been collected therein. This threshold value, which reflects the equilibrium state is usually below the catalyst light-off temperature. A relatively slow increase in exhaust temperature, which is usually the case in conventional engines, therefore results in a limited amount of hydrocarbons remaining adsorbed until the catalyst has reached the light-off temperature. However, the rapid increase in exhaust temperature due to the invention reduces the amount desorbed from the hydrocarbon adsorber 24 before the catalyst 3 has reached its light-off temperature.

Figure 2:
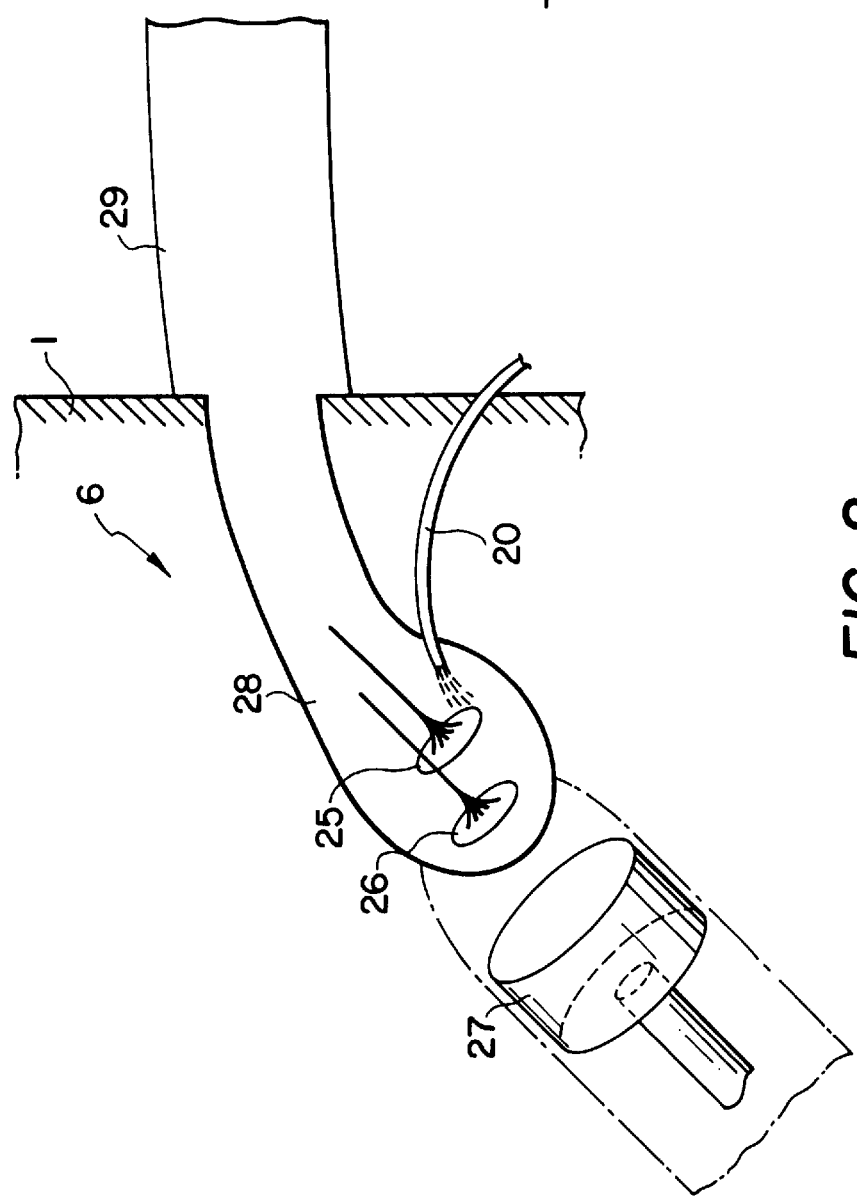
FIG. 2 shows a slightly enlarged view of an exhaust port to be used in accordance with the invention.

FIG. 2 illustrates, on a larger scaler a perspective view of a primary pipe 6, i.e. one of the three cylinder outlets shown in FIG. 1. The exhaust gases of the engine 1 are discharged via two exhaust valves 25, 26. For reasons of clarity, FIG. 2 also depicts a piston 27 forming part of the engine. It will be readily apparent for those skilled in the art that the engine may comprise for example six cylinders, each one having a primary pipe with the same design as that which is shown in FIG. 2.

Furthermore, the air duct branch 20 is arranged in the primary pipe 6 in a manner so that it terminates in close connection to the exhaust valves 25, 26. Preferably, the air duct branch 20 is arranged so that the injected secondary air is directed towards a point located substantially half-way between the valves 25, 26. The air duct branch 20 is formed as a moulded duct in the cylinder head of the engine. It should be noted that the air supply system may alternatively be designed with one air duct branch for each exhaust valve.

In accordance with the invention, the primary pipe 6 (as well as the other primary pipes 7 and 8 shown in FIG. 1) is formed by a first tubular section 28 and a second tubular section 29. The second section 29 has a cross-sectional area which exceeds that of the first section 28. Preferably, the cross-sectional area of the second section 29 is approximately two to five times the cross-sectional area of the first section 28, as regarded perpendicular to the direction of the exhaust gas flaw The sections 28, 29 are preferably circular, but other designs are also possible within the scope of the invention, for example rectangular or elliptical. The transition from the first section 28 to the second section 29 is preferably arranged aligned (i.e. flush) with the top side of the engine's 1 cylinder head.

The operation of the invention will now be described. The engine 1 operates according to the four-stroke cycle, which means that the exhaust valves 25, 26 are closed during the compression and expansion phases of the engine 1. During this period, the first section 28 is substantially filled with secondary air via the air duct branch 20. Also, the second section 29 will normally be at least partly filled with secondary air. When the valves 25, 26 are opened, the exhaust gas is discharged and forms the above-described gas mixture together with the secondary air. The operation of the air pump 17 for injection of secondary air is controlled by the control unit 11 so as to provide an oxidation of said gas mixture. The system is preferably operated so as to provide an air/fuel ratio of the gas mixture of approximately $\lambda=1.0-1.3$.

Figure 3:
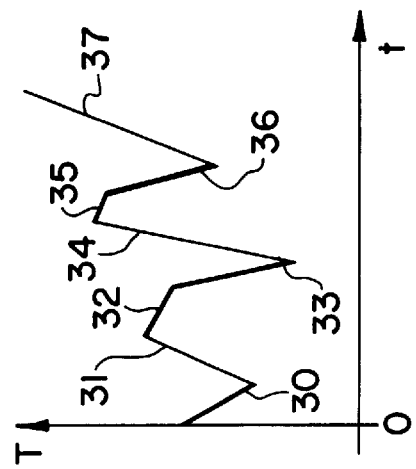
FIG. 3 illustrates schematically the oxidation process in the exhaust manifold.

The oxidation process in the primary pipe 6 is schematically illustrated in FIG. 3, which shows the temperature T of said gas mixture (i.e. the mixture of the secondary air and the exhaust gas) as a function of time t. It should be noted that as time t elapses, the gas mixture flows along the pipe 6. Consequently, the temperature T at a certain point in time is not related to a specific position in the pipe 6.

When the exhaust valves 25, 26 are opened (i.e. t=0), the rapid mixing of the exhaust gas and the secondary air causes the gas mixture to lose some of its heat energy, consequently reducing its temperature T (FIG. 37 step 30). However, the oxidation of the gas mixture which then occurs after a short time period will increase the temperature T (step 31). The position of the second section 29, i.e. the length of the first section 29, can be chosen at a distance which is further away from the exhaust valves 25, 26, due to the fact that there is an increase of the temperature in the first section 28. Furthermore, the fact that the gas mixture flows along the first section 28 will reduce the gas temperature T (stop 32) due to the cooling effect which the inner walls of the first section 28 imposes on the gas mixture.

When the gas mixture "pulse" reaches the second section 29, the transition from the first section 28 to the second section 29 will result in a new reduction of the temperature (step 33). This is due to the fact that the gas mixture which flows into the second section 29 will be mixed with a relatively high gas volume (i.e. a mixture of exhaust gas and secondary air) which was fed to the second section 29 during the previous operation phase. The volume of this "old" gas mixture depends on the increase in volume from the first section 28 to the second section 29, i.e. the relationship between their cross-sectional areas.

The expanding volume in the second section 29 provides access to oxygen in the "old" gas mixture so that the exhaust oxidation can be further developed. This mixing is aided by means of turbulence which is generated in the second section 29. Again, this results In an increase of the temperature T of the gas mixture (step 34). The gas mixture then flows along the second section 29, resulting once more in a reduction of the temperature T, mainly due to the cooling effect of the inner walls of the second section 29 (step 35). Furthermore, the gas mixture reaches the plenum volume (cf. FIG. 1) where all the primary pipes 6, 7, 8 coincide. The temperature T decreases in the plenum volume (step 36), once again due to the increase in volume. Finally, the exhaust oxidation continues in the plenum volume and along the exhaust pipe 4 (step 37). The heat energy of the gas mixture is transferred to the catalyst 3 (and to the hydrocarbon adsorber 24, if such a device is used), which will become rapidly heated.

An advantage of the invention is that for each oxidation stage from the exhaust valves 25, 26 to the exhaust pipe 4, the critical temperature at which oxidation can occur is always exceeded, due to the fact that mixing with air occurs at each stage. In this manner, there is no need to use a separate ignition device in order to ignite the gas mixture.

A further advantage of the invention is that a large part of the exhaust oxidation takes place close to the catalyst. In this way, very low losses in heat energy will occur until the gas mixture reaches the catalyst.

The on and off switching of the air pump 17 for injection of secondary air is controlled by the control unit 11 s0 as to provide an oxidation of said gas mixture. The system is preferably operated so as to provide an air/fuel ratio of approximately λ=1.0–1.3. In this manner, the threshold temperature $T_t$ can be exceeded so that oxidation occurs in three different main stages, i.e. immediately downstream of the exhaust valves 25, 26, in the transition between the first section 28 and the second section 29 of the primary pipe 6, and in the plenum volume of the exhaust manifold 5. Experiments have shown that the system according to the invention provides a time taken for the light-off temperature of the catalyst 3 to be reached which is approximately equal to 5–10 seconds.

The oxidation occurs in a mater so that all the necessary conditions (for example as regards temperature) are fulfilled. The first stage of the oxidation provides a possibility to arrange the subsequent stages of the oxidation at a greater distance from the exhaust valves than otherwise would have been possible. In this manner, it is possible to optimize the external gas exchange of the engine by means of the higher degrees of freedom which this "multi-stage" process provides.

It should be noted that due to the fact that the control unit 11 contains information regarding the temperature of the catalyst 3, the control unit 11 is adapted to control the supply of secondary air and the generation of hydrogen in the exhaust gas depending on the temperature of the catalyst. This can be accomplished through the fact that the temperature sensor 15 is connected to the control unit 11. The operation of the invention can be controlled in dependence of the value of the temperature. For example, the generation of hydrogen and the supply of secondary air can be switched off when the catalyst's purification has reached a certain level. This level can be calculated from a temperature value. Also, the control unit 11 may be arranged to initiate the generation of hydrogen and the supply of secondary air if the temperature value is lower than a certain limit when the engine is started. According to an alternative embodiment, the control unit 11 calculates an "expected" catalyst temperature from values of the ambient temperature, the temperature of the cooling water of the engine or other available engine parameters. The oxidation process is continued until a desired level of conversion of harmful components in the exhaust gas by the catalyst 3 is reached, as estimated from the catalyst temperature. A certain temperature value may be used for starting the oxidation process, and another temperature value may be used for terminating the oxidation process.

It should be noted that in accordance with the invention the increase in temperature is as rapid that a substantial part of the hydrocarbon components will not desorb from the hydrocarbon trap 24, in spite of the fact that this would normally had taken place (during equilibrium).

According to a further embodiment, the control unit 11 can be adapted to control the oxidation in a manner so that essentially no oxidation occurs until the exhaust gas reaches the catalyst- This is achieved by adjusting the spark retardation of the engine to a value which essentially corresponds to normal idling, i.e. the spark timing is not delayed. The advantage with this operation is that very low losses of heat energy occur in the manifold.

Figure 4:
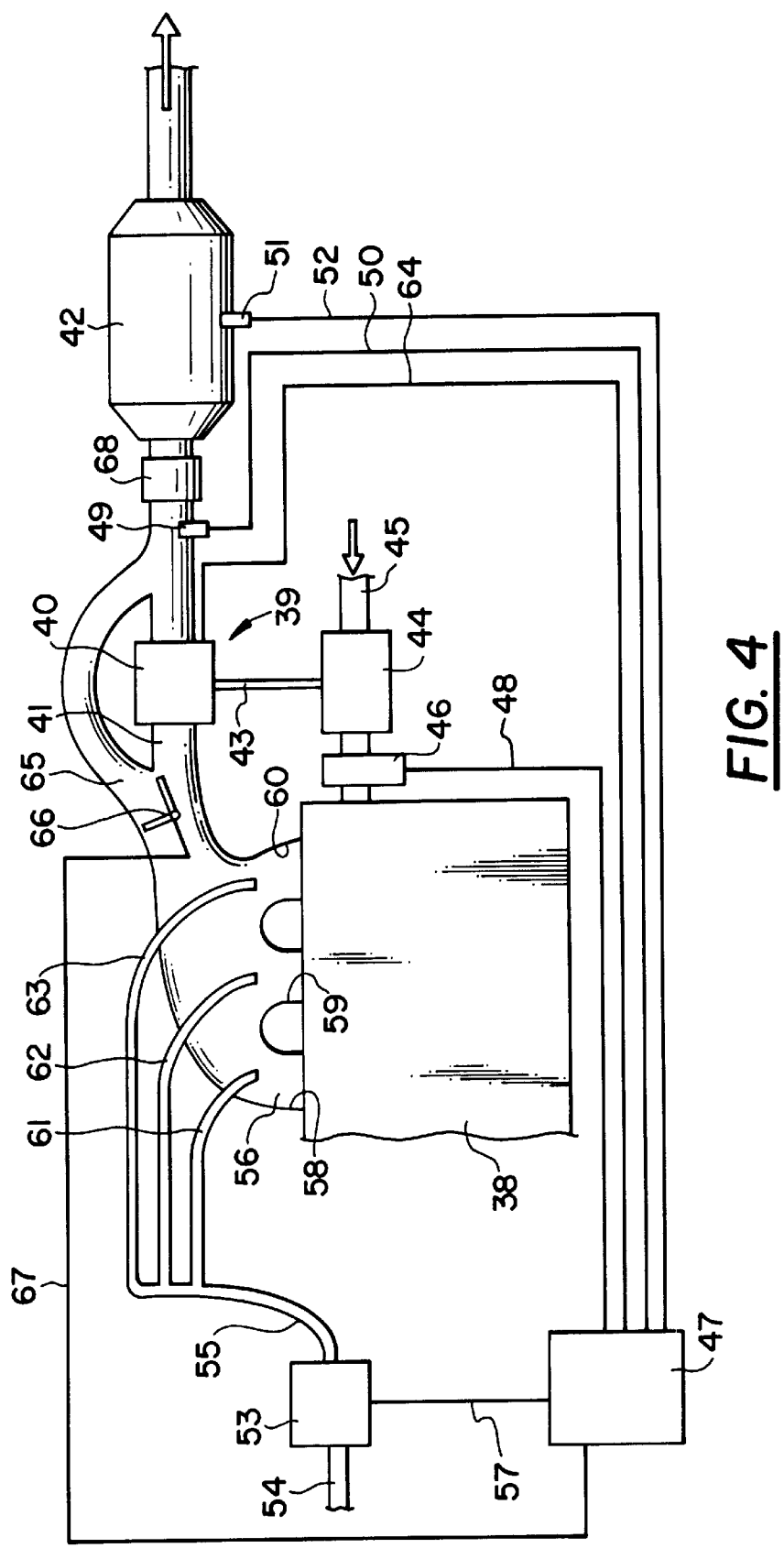
FIG. 4 illustrates schematically a second embodiment of the present invention.

FIG. 4 illustrates schematically a system comprising a second embodiment of the present invention, which is arranged in connection with a combustion engine 38 of the type which is provided with a turbo device 39. The turbo device 39 is previously known and comprises a turbine 40 through which the exhaust gas is fed via an exhaust pipe 41. The exhaust gas is further fed to a catalyst 42, preferably a conventional three-way catalyst.

The turbine 40 Is arranged on a shaft 43 which is common with a compressor impeller 44, which in turn forces air from the atmosphere via an input duct 45 into the engine 38. In a conventional manner, this input air is mixed with fuel in air/fuel mixture forming means 46 of the type which is generally similar to that which has been described above. The mixture forming means 46 is controlled by an electronic control unit 47 via an electrical connection 48. The mixture forming means 46 comprises at least one fuel injector (not shown) and an air inlet valve (not shown) and can be controlled so as to adapt the air-fuel mixture to the engine 38 in accordance with the operating conditions.

The control unit 47 is also connected to various sensors and control functions of the engine 38. This is generally similar to that which has been described with reference to FIG. 1. In particular, the system comprises an oxygen sensor 49 which is connected to the control unit 47 via an electrical connection 50, and a catalyst temperature sensor 51 which is connected to the control unit 47 via a further electrical connection 52.

The control unit 47 is adapted to control the operation of the engine 38 during cold starting in a manner so as to obtain a relatively high concentration of hydrogen in the exhaust gas. Furthermore, the control unit 47 is adapted to control an air supply system in the for of an air pump 53 having an input air duct 54 for air from the atmosphere and an output air duct 55 connected to the exhaust manifold 56. The air pump 53, which is connected to the control unit 47 via an electrical connection 57, is preferably operated so as to provide secondary air during the time period during which an excess of hydrogen in the exhaust gas is generated. Since the embodiment illustrated in FIG. 4 is one including a turbo device 39, the exhaust pressure is increased as compared to an engine without a turbo device. Consequently, the air pump 53 must be adapted to supply an air pressure which is high enough to force air into the exhaust manifold 56 In spite of the high pressure which prevails therein.

The engine 38 is illustrated with an exhaust manifold 56 having three cylinder outlets 52, 59, 60, indicating that the engine 38 is of the six-cylinder type. In order to provide a quick response of the turbo device 39 during operation, the volume of the exhaust gas manifold 56 is preferably kept as low as possible while still keeping the residence time of exhaust gases upstream of the turbine 40 sufficiently long so as to provide an exhaust oxidation of substantially all combustible components in the exhaust gas before the gas mixture is fed to the turbine 40.

The air duct 55 is designed with three branches 61, 62, 63, which correspond to each of the cylinder outlets 58, 59, 60. According to an alternative embodiment, the cylinder outlets 58, 59, 60 can be provided with primary pipes of the type which has been described above.

In accordance with the embodiment, and during cold starting of the engine 38, secondary air is mixed with the exhaust gas. This generates an exhaust oxidation, which increases the heat energy in the exhaust system.

The turbo device 39 is provided with a waste gate valve (not shown) which is arranged in connection with the turbine 40. The waste gate valve can open to provide a bypass passage in case the exhaust gas pressure should be too high. Preferably, the waste gate valve is of the type which is electrically controllable. However, a pressure-controlled waste gate valve can also be used. The waste gate valve is connected to the control unit 47 via a further electrical connection 64. During cold starting, i.e. when the control unit 47 has determined that exhaust oxidation should be initiated, the waste gate valve can be controlled to assume its open or partially open condition in order to control the pressure in the exhaust manifold, which in turn makes it possible to optimise the oxidation.

Furthermore, the exhaust pipe 41 is preferably split into a bypass pipe 65, which is provided with a controllable valve 66. The valve 66 is connected to the control unit 47 via an electrical connection 67. By means of this arrangement, the control unit 47 is adapted to control the operation of the valve 66 for bypassing the exhaust gas around the turbine 40. This is particularly advantageous during cold starting since exhaust oxidation can then occur in the bypass pipe 65 and further downstream in the exhaust system. The controllable valve 66 shown in FIG. 4 is arranged at the upstream end of the bypass pipe 65. Alternatively, the valve 66 may instead be arranged at the downstream end of the bypass pipe 65. Furthermore, the valve 66 may be integrally designed with the above-mentioned waste-gate valve, thereby forming one single controllable valve which can be used for directing the exhaust gas.

The bypass pipe 65 is preferably designed with relatively large dimensions. In this manner, the volume of the exhaust manifold 56 can be relatively small, which in turn provides a quicker response of the turbo operation. Furthermore, the fact that the manifold 56 is of small dimensions constitutes an advantage, since it makes the engine system more compact.

According to an embodiment which is not shown in the figures, the primary pipes (not shown) and/or the bypass pipe 65 can be designed as two or more sections of different cross-sectional areas, similar to that illustrated in FIG. 2.

Furthermore, the system illustrated in FIG. 4 is preferably provided with a hydrocarbon adsorber 68 arranged upstream of the catalyst 42. The operation of this hydrocarbon adsorber is the same as that which has been described above.

Whilst the invention has been described above with respect to certain preferred embodiments thereof, the invention is not limited to these but may be varied widely within the scope of the appended claims. For example, the primary pipes mentioned above can be provided with more than two sections having different cross-sectional areas.

Furthermore, according to an alternative embodiment, the above-mentioned hydrocarbon adsorber can be omitted. Also, according to yet another alternative embodiment, the bypass pipe 64 with its valve 65 (cf. FIG. 4) can be omitted from the exhaust system. Finally, in the case where the bypass pipe 64 is used, the cylinder outlets can be provided with primary pipes of the same types as illustrated in FIG. 1.

What is claimed is:

1. A device for reducing emissions in a catalytic converter exhaust system for a combustion engine, said catalytic converter providing reduced emissions after a light-off time has passed during start-up of the engine, said device comprising:
   an exhaust pipe connecting the engine with the catalytic converter,
   an air/fuel mixture forming means for providing a mixture of air and fuel to the engine,
   a control unit adapted for controlling the air-fuel mixture forming means so that a high concentration of hydrogen and other combustible gasses are generated in the exhaust gas during start-up of the engine, and
   an air supply means for supplying secondary air downstream of at lease one engine exhaust valve during cold starting of the engine, for forming a gas mixture with the exhaust gas,
   said engine being provided with a plurality of primary exhaust outlet pipes, wherein said primary exhaust outlet pipes are shaped with a first section and a second section, the second section having a larger cross-sectional area than the first section, said second section positioned downstream of said first section with respect to the direction of flow of the exhaust gas, and wherein
   said control unit is adapted to control said generation of hydrogen and the operation of said air supply means, thereby generating an exhaust oxidation in said gas mixture, so that heat energy generated during the oxidation is supplied to the catalyst, thereby providing a reduction to the light-off time of the catalyst.

2. Device according to claim 1, wherein said primary exhaust outlet pipes are shaped with a first section and a second section, the second section having a larger cross-sectional area than the first section.

3. Device according to claim 1, wherein the cross-sectional area of the second section is approximately two to five times the cross-sectional area of the first section, as regarded perpendicular to the exhaust flow direction.

4. Device according to claim 3, the engine being provided with a cylinder head, wherein the upstream end of the second section is located aligned with the top side of said cylinder head.

5. Device according to claim 4, wherein the control unit is adapted to control the generation of hydrogen and the operation of said air supply means depending on the temperature of said catalyst.

6. Device according to claim 5, wherein the catalyst is equipped with a temperature sensor.

7. Device according to claim 5, wherein the control unit is adapted for calculating an approximate value of said temperature depending on operational parameters of the engine.

8. Device according to claim 1, wherein a hydrocarbon adsorber is arranged upstream of the catalyst or is integrated within the catalyst.

9. The device of claim 1, wherein said other combustible gases are selected from the group consisting of carbon monoxide and hydrocarbons.

10. Method for reducing emissions in a catalytic converter exhaust system for a combustion engine, said catalytic converter providing reduced emissions after a light-off time has passed during start-up of the engine, wherein the catalytic converter and the engine are connected by an exhaust pipe and the engine being provided with at least two primary exhaust outlet pipes coinciding in a plenum volume forming part of an exhaust manifold, wherein said primary exhaust outlet pipes are shaped with a first section and a second section, the second section having a larger cross-sectional area than the first section, said second section positioned downstream of said first section with respect to the direction of flow of the exhaust gas, said method comprising the following steps:

providing a mixture of air and fuel to the engine via air/fuel mixture forming means, controlling said air/fuel mixture forming means so that a high concentration of hydrogen and other combustible gases are generated in the exhaust gas during the start-up of the engine, supplying secondary air downstream of at least one engine exhaust valve during cold starting of the engine for forming a gas mixture with said exhaust gas, and generating an oxidation of said gas mixture in the primary exhaust outlet pipes, the exhaust manifold and the exhaust pipe, so that heat energy generated by means of said oxidation is supplied to the catalyst, thereby providing a reduction of the light-off time of the catalyst.

11. Method according to claim 10, wherein said oxidation is controlled in the following steps:

generating a first oxidation stage in said gas mixture essentially immediately downstream of said at least one exhaust valve, mixing said gas mixture with further air, and generating a second oxidation stage in said gas mixture after said nixing with further air.

12. Method according to claim 11, wherein the generation of hydrogen and the operation of said air supply is made depending on the temperature of said catalyst.

13. The method of claim 10, wherein said other combustible gases are selected from the group consisting of carbon monoxide and hydrocarbons.

* * * * *